(12) United States Patent
Shi

(10) Patent No.: US 10,024,223 B2
(45) Date of Patent: Jul. 17, 2018

(54) TWO-STROKE INTERNAL COMBUSTION ENGINE

(71) Applicant: Jianmin Shi, Beijing (CN)

(72) Inventor: Jianmin Shi, Beijing (CN)

( * ) Notice: Subject to any disclaimer, the term of this patent is extended or adjusted under 35 U.S.C. 154(b) by 0 days.

(21) Appl. No.: 15/508,045

(22) PCT Filed: Aug. 10, 2015

(86) PCT No.: PCT/CN2015/000579
§ 371 (c)(1),
(2) Date: Mar. 1, 2017

(87) PCT Pub. No.: WO2016/041298
PCT Pub. Date: Mar. 24, 2016

(65) Prior Publication Data
US 2017/0260895 A1  Sep. 14, 2017

(30) Foreign Application Priority Data

Sep. 18, 2014 (CN) .......................... 2014 1 0475456

(51) Int. Cl.
*F02B 25/20* (2006.01)
*F02F 1/42* (2006.01)
*F02B 75/02* (2006.01)

(52) U.S. Cl.
CPC .............. *F02B 25/20* (2013.01); *F02B 75/02* (2013.01); *F02F 1/42* (2013.01); *F02B 2075/025* (2013.01)

(58) Field of Classification Search
CPC .......... F02B 2075/025; F02B 2075/125; F02B 17/005; F02B 23/101; F02B 23/0624; F02F 1/242
See application file for complete search history.

(56) References Cited

U.S. PATENT DOCUMENTS

| 2,242,274 A * | 5/1941 | Thysse | F02B 19/14 |
|---|---|---|---|
| | | | 123/261 |
| 4,351,294 A * | 9/1982 | Giddings | F02B 23/00 |
| | | | 123/260 |
| 4,883,030 A | 11/1989 | Tanahashi et al. | |

(Continued)

FOREIGN PATENT DOCUMENTS

| CN | 1034247 A | 7/1989 |
|---|---|---|
| CN | 1157878 A | 8/1997 |

(Continued)

*Primary Examiner* — Long T Tran
(74) *Attorney, Agent, or Firm* — Andrew W. Chu; Craft Chu PLLC

(57) ABSTRACT

A two-stroke internal combustion engine includes a diversion fin and an allowance slot. The diversion fin is a structure that has flanges at two ends and a rectangular longitudinal cross section profile. The diversion fin is clamped by a cylinder head and a cylinder block. The diversion fin extends along the diameter direction of the cylinder head and is positioned between an air inlet channel and an air exhaust channel. The diversion fin separates the air inlet channel from the air exhaust channel. The upper end of the diversion fin is provided with a transverse through groove at a position corresponding to an oil nozzle of an oil injector. The allowance slot is disposed on a piston and is positioned in the center of a combustor. The position of the allowance slot corresponds to the position of the diversion fin.

6 Claims, 4 Drawing Sheets

(56) References Cited

U.S. PATENT DOCUMENTS

| | | | |
|---|---|---|---|
| 4,957,081 A | | 9/1990 | Ito et al. |
| 2007/0023002 A1* | | 2/2007 | Alger, II ............. F02B 19/1023 |
| | | | 123/275 |

FOREIGN PATENT DOCUMENTS

| | | | |
|---|---|---|---|
| CN | 101660461 A | | 3/2010 |
| CN | 104234818 A | | 12/2014 |
| CN | 204099043 A | | 1/2015 |

* cited by examiner

TWO-STROKE INTERNAL COMBUSTION ENGINE

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention belongs to the technical field of internal combustion engine, specifically to a two-stroke internal combustion engine.

2. Description of Related Art Including Information Disclosed Under 37 CFR 1.97 and 37 CFR 1.98.

A conventional two-stroke internal combustion engine usually includes a cylinder block and a piston. A gas inlet and an exhaust opening of the cylinder block of the conventional two-stroke internal combustion engine are disposed at the lower part of the cylinder wall and close to each other, thus resulting in scavenging short circuit, which means that some air entering the cylinder block is directly exhausted via the exhaust opening, the cylinder performs scavenging insufficiently at the upper part; and some mixed gases are directly exhausted into the atmosphere without combustion, causing technical problems of wasting fuel and generating high-HC (hydrocarbon) waste gas.

The air inlet and the exhaust opening of the conventional two-stroke internal combustion engine are disposed at the bottom of the cylinder wall, so in order to avoid lubricating oil from entering the combustor via the air inlet to result in failure to add the lubricating oil in the crankcase and to lubricate movable components such as the piston and crankshaft, the lubrication mode of adding the lubricating oil special for the two-stroke internal combustion engine into in the fuel oil is employed. However, the lubricating effect is poor; and the life span of the internal combustion engine is shortened. Moreover, participation of the lubricating oil in the combustion results in high-pollutant emission and the combustor tends to generate carbon deposit; meanwhile the piston ring easily gets stuck by the carbon deposit, resulting in gas leak in the combustion engine and further reducing the efficiency of the internal combustion engine.

A patent document with publication No. CN1034247A discloses a technical solution of a two-stroke internal combustion engine. The two-stroke internal combustion engine includes a cylinder head, a cylinder block, an intake valve, an exhaust valve and an oil spray nozzle. The internal combustion engine also includes a protruding portion; the inner wall of the cylinder head is formed with a portion which protrudes toward the combustor; the protruding portion extends along the whole diameter of the inner wall of the cylinder head, and is positioned between an air inlet channel and an air exhaust channel; and the protruding portion separates the air inlet channel from the air exhaust channel. The shielding component is integrally molded with the cylinder head. A spark plug ignites the mixed gas, and the temperature at the end of the combustion is 2,000-2,500 DEG C., so the temperature around the spark plug is higher. The ledges and corners of the shielding component are burnt, and the area around the spark plug is more serious, so the whole cylinder head needs to be replaced after serious burning.

The shielding component is shaped as an inverted triangle. The intake-side plane of the shielding component inclines downward to the exhaust side, the gas entering the cylinder is guided to the lower part of the exhaust side along the intake-side plane of the shielding component, so the fresh air is exhausted in a way of being mixed with the burned waste gas, failing to generate the loop scavenging effect. Meanwhile, the waste gas at the lower part of the intake valve cannot be exhausted, reducing the scavenging effect.

The shielding component is shaped as an inverted triangle. The relatively wide root of the shielding component affects the flame spreading speed, causing a decline to the combustion efficiency.

The shielding component is disposed close to the intake valve, and ⅓ part of the air inlet of the intake valve is shielded, reducing the air inflow effect and the scavenging effect, and causing a decline to the power of the internal combustion engine.

The position and shape of the shield component result in that the combustion starts from one side of the shielding component and then that the flame spreads to the other side of the shielding component. Such combustion mode generates the following results. First, the combustion speed is low; the power and fuel oil efficiency of the internal combustion engine both decline; the internal combustion engine has problems of overheating; the cylinder head, cylinder and piston perform dramatic thermal deformation, which affect the service life. Second, the combustion always starts from one side, and the combustion pressure is not uniform, causing the problem that the piston shakes in the cylinder and the problems of collision between the piston and the cylinder wall and abnormal wearing of the piston and the cylinder wall, and reducing the efficiency and life span of the internal combustion engine. Meanwhile, the shielding component is not uniform in pressure on two sides, so the shielding component needs to be solid, resulting in a relatively large size, a relatively wide root, and occupation of a relatively large area in the combustor of the cylinder head. Therefore, the intake valve and the exhaust valve must be reduced, affecting the exhausting effect. Third, the temperature distribution in the combustor is not uniform, so the cylinder head, the cylinder wall and the piston are not uniformly heated. The temperature at the intake valve is always higher than the temperature on the exhaust side. The cylinder head, the cylinder and the piston are thermally deformed, causing abnormal wear and causing a decline to the power, efficiency and life span.

In order to solve the above technical problems, a four-stroke internal combustion engine is usually adopted. However, the four-stroke internal combustion engine has a complicated structure, and the power density of the four-stroke internal combustion engine is about 50% lower than that the power density of the two-stroke internal combustion engine, so the four-stroke internal combustion engine occupies a large space and has a large weight under the condition of the same power output.

BRIEF SUMMARY OF THE INVENTION

The objective of the present invention is to provide a two-stroke internal combustion engine, solving the technical problem of a part of the unburned mixed gas is directly exhausted and is exhausted together with the waste gas, reducing the content of HC in the waste gas, improving the gas intake, gas exhaust and gas exchange efficiency, enhancing the effective power of the internal combustion engine, decreasing the thermal deformation of the cylinder head, cylinder and piston, prolonging the life span of the internal combustion engine, and ensuring a compact structure.

The technical solution of the present invention is as follows. A two-stroke internal combustion engine includes a cylinder head, a cylinder block, a piston, an intake valve, an exhaust valve, an oil injector, a diversion fin and an allowance slot. The diversion fin is a rectangular structure. The diversion fin is fixed on the cylinder head. The diversion fin extends along the diameter direction of the cylinder head and is positioned between an air inlet channel and an air exhaust channel. The deflector pin separates the air inlet channel from the air exhaust channel. The upper part of the deflector pin is provided with a transverse through groove at a position corresponding to an oil nozzle of the oil injector. The allowance slot is disposed on the piston. The allowance slot is positioned in the center of the combustor, and the position of the allowance slot is corresponding to the diversion fin.

The cross section of the diversion fin is arc-shaped, which means that the surface of the diversion fin corresponding to the air inlet channel is an inner concave.

The deflector pin is provided with two vortex channels at the lower ends; the two vortex channels extend along the transverse direction of the diversion fin; the two vortex channels are longitudinally distributed along the diversion fin, and the outside walls of the two vortex channels are respectively aligned with the outside walls of the combustor. The channels correspond to the loop structure of the combustor.

The present invention has the following beneficial effects: 1) The two-stroke internal combustion engine adopts a structure containing an overhead inlet valve, an exhaust valve, the oil injector and the diversion fin, solving the technical problems of direct emission of some unburned mixed gases and emission of the unburned gases together with the waste gas; 2) the two-stroke internal combustion engine adopts the diversion fin structure, solving the technical problem of burning of the diversion fin, enhancing the flame spreading speed, namely solving the problem of low combustion speed, and enhancing the gas intake, gas exhaust and gas exchange efficiency; 3) the two-stroke internal combustion engine develops the advantages of the four-stroke internal combustion engine, effectively enhances the power density and mechanical efficiency of the internal combustion engine and reduces the emission; 4) the two-stroke internal combustion engine is well lubricated, reducing friction loss, improving effective power, decreasing thermal deformation of the cylinder head, cylinder and piston, prolonging the life span of the internal combustion engine, and ensuring a compact and reliable structure and stable working; 5) through contrast experiment, it is found that the internal combustion engine of such structure has power enhanced by 70%-100% under the condition of the same delivery capacity, and with the support a boosting system, the power can be further enhanced, obtaining higher power with a smaller internal combustion engine size and also saving the raw materials and production cost for producing the internal combustion engine. At the same power, the internal combustion engine can obtain a lower rotation speed, less wear, a longer life span, saves more fuel oil, and reduces service cost.

Marks in the figures: 1, diversion fin; 2, concession slot; 3, cylinder head; 4, cylinder block; 5, piston; 6, intake valve; 7, exhaust valve; 8, air inlet channel; 9, air exhaust channel; 10, combustor; 13, oil injector; 20, diversion fin root; 21, diversion fin root mounting groove.

DETAILED DESCRIPTION OF THE INVENTION

Figure 1:
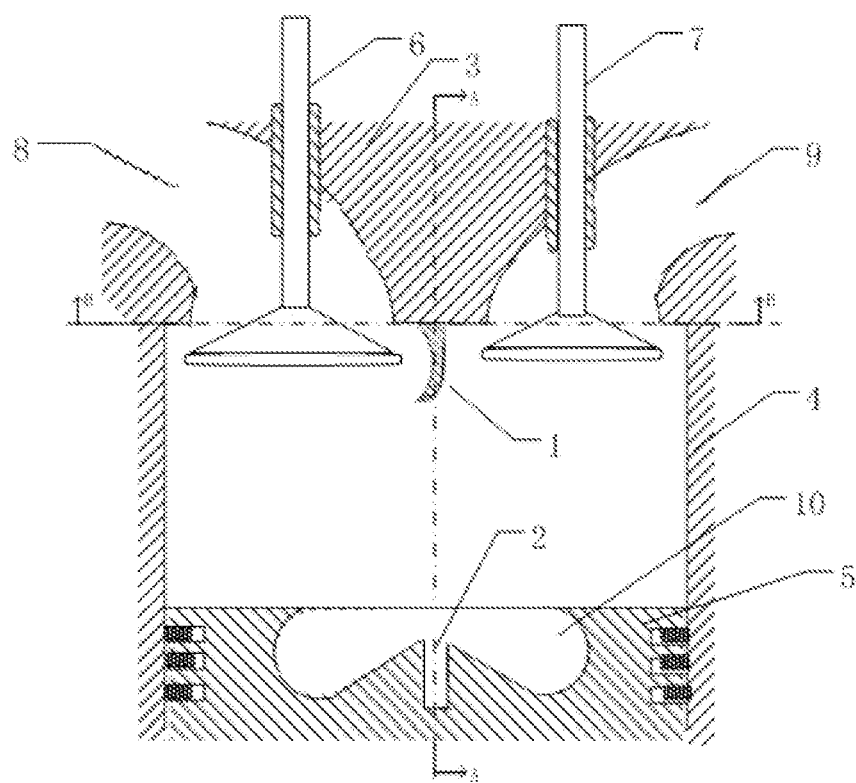
FIG. 1 is a structural sectional view of a two-stroke internal combustion engine.

As shown in FIG. 1, the present invention provides a two-stroke internal combustion engine, comprising a diversion fin 1, an allowance slot 2, a cylinder head 3, a cylinder block 4, a piston 5, an intake valve 6, an exhaust valve 7 and an oil injector 13.

The two ends of the root of the diversion fin 1 have flanges. The diversion fin 1 has a rectangular longitudinal cross section profile. The diversion fin 1 is fixed on the cylinder head 3. The diversion fin 1 extends along the diameter direction of the cylinder and is positioned between an air inlet channel 8 and an air exhaust channel 9. The diversion fin 1 separates the air inlet channel 8 from the air exhaust channel 9. The upper end of the diversion fin 1 is provided with a transverse through groove 12 at a position corresponding to an oil nozzle of an oil injector. The transverse through groove 12 ensures that the oil injector sprays oil normally. The oil injector can spray fuel oil to two sides of the diversion fin 1 at the same time, fulfilling the purpose of sufficient combustion on two sides of the diversion fin 1, and avoiding the problem that a part of the fuel oil cannot be combusted because the fuel oil is sprayed onto the diversion fin 1. The allowance slot 2 is disposed on the piston 5. The allowance slot 2 is positioned in the center of the combustor 10, and the position of the allowance slot 2 is corresponding to the position of the diversion fin 1. With the configuration of the allowance slot 2, the piston can approach the inner surface of the cylinder head 3 as much as possible, enhancing the compression ratio of the internal combustion engine, and further enhancing the power and efficiency of the internal combustion engine.

As shown in the FIG. 1, the cross section of the diversion fin 1 has an arced profile on one side; the height of the diversion fin 1 is 1-3 times the upstroke of the intake valve 6, which means that the diversion fin 1 extends downward from the cylinder head 3 by a distance of 1-3 times the upstroke of the intake vale 6, and the radian radius of the deflector 1 is in a range of 1/8 times-4 times the diameter of the intake valve 6. According to different cylinder diameter and piston stroke, the diversion fin with a proper extension length and a proper radian can be selected to avoid the generation of surge. Meanwhile, the arced structure of the diversion fin can guide the air intake to the lower side of the intake valve, solving the problem of poor scavenging on the lower side of the intake valve.

The diversion fin 1 is made of materials that have resistance to burning and high toughness and go well with the expansion coefficient of the materials of the cylinder head, preferably ceramic-based composite materials or nickel-based alloys.

Figure 5:
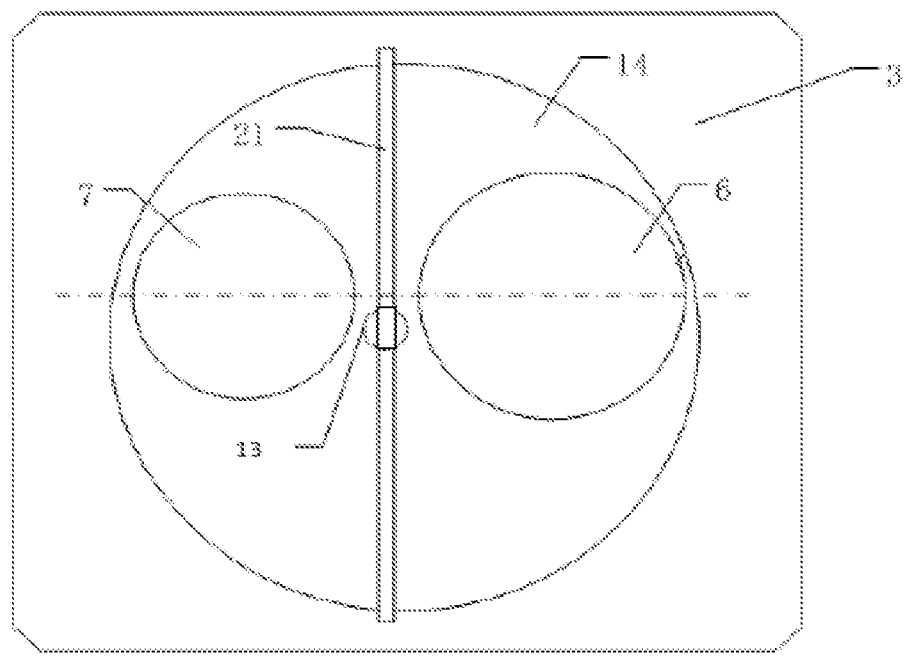
FIG. 5 is a sectional view of FIG. 1 in B-B direction.

As shown in the FIG. 5, the cylinder head 3 is formed with a diversion fin root mounting base 21 at a position of the inner surface corresponding to the diversion fin 1; the two ends of the diversion fin root mounting groove 21 extendout of the inner surface of the cylinder head 3; the diversion fin root 20 is in tight fit with and is embedded in the diversion fin root mounting groove 21 on the inner surface of the cylinder head 3 and is clamped and fastened by the cylinder head 3 and the cylinder block 4 during assembling. Such structure is conveniently processed and replaced and is highly maintainable. When the diversion fin is damaged, it is not needed to replace the whole cylinder head 3, so the maintenance cost is low.

Figure 8:
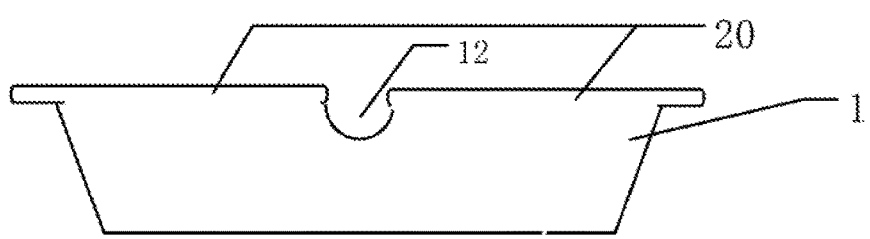
FIG. 8 is a schematic structural view of a diversion fin in the two-stroke internal combustion engine.

As shown in FIG. 8, the upper part of the diversion fin 1 is called the diversion fin root 20, and the diversion fin root 20 is embedded in the diversion fin root mounting groove 21 of the cylinder head 3.

Figure 2:
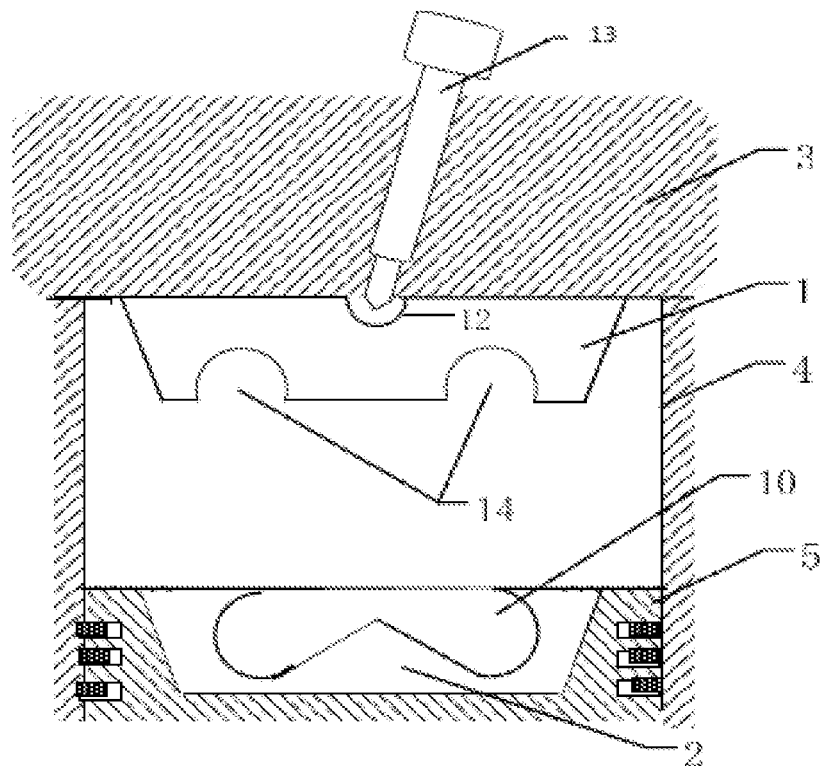
FIG. 2 is a sectional view of FIG. 1 in A-A direction.
Figure 3:
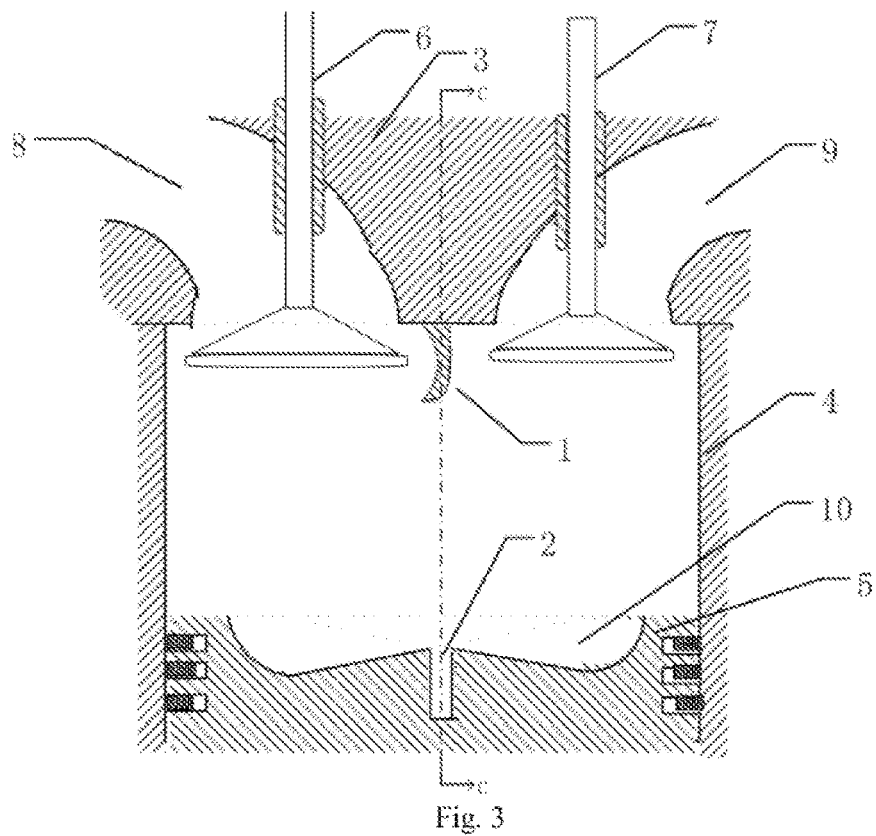
FIG. 3 is a structural view of an application structure of the internal combustion engine in a shallow-basin shaped combustor.
Figure 4:
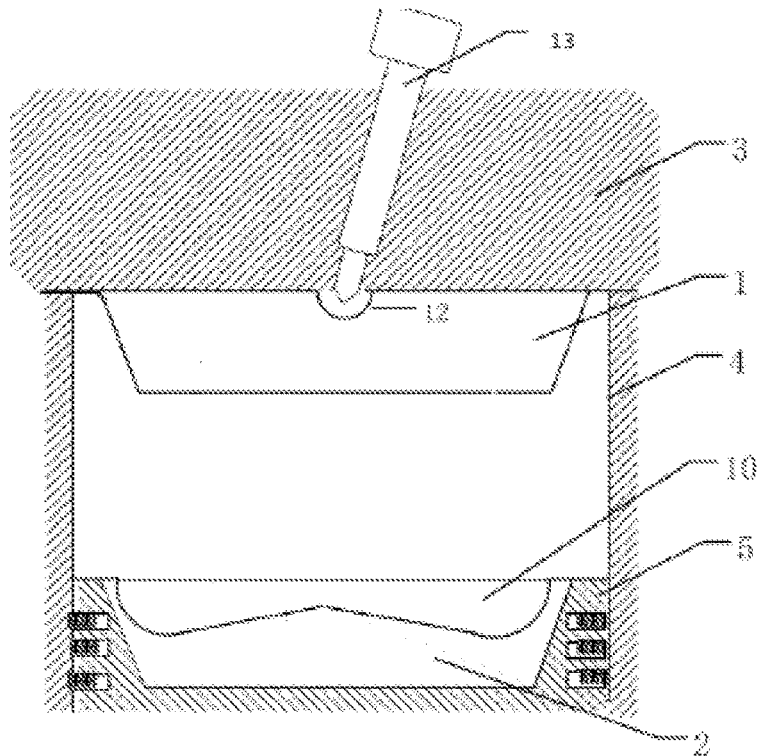
FIG. 4 is a sectional view of FIG. 3 in C-C direction.

As shown in FIG. 2, the diversion fin 1 is provided with two vortex channels 14 at the lower ends; the two vortex channels 14 extend along the transverse direction of the diversion fin 1; the two vortex channels 14 are longitudinally distributed along the diversion fin 1; the outside walls of the two vortex channels 14 are respectively aligned with the two outside walls of the combustor 10; and the vortex channels 14 correspond to the loop structure of the combustor 10, and used to perform vortex movement, so the air and the fuel oil achieve a better mixed combustion effect.

Figure 6:
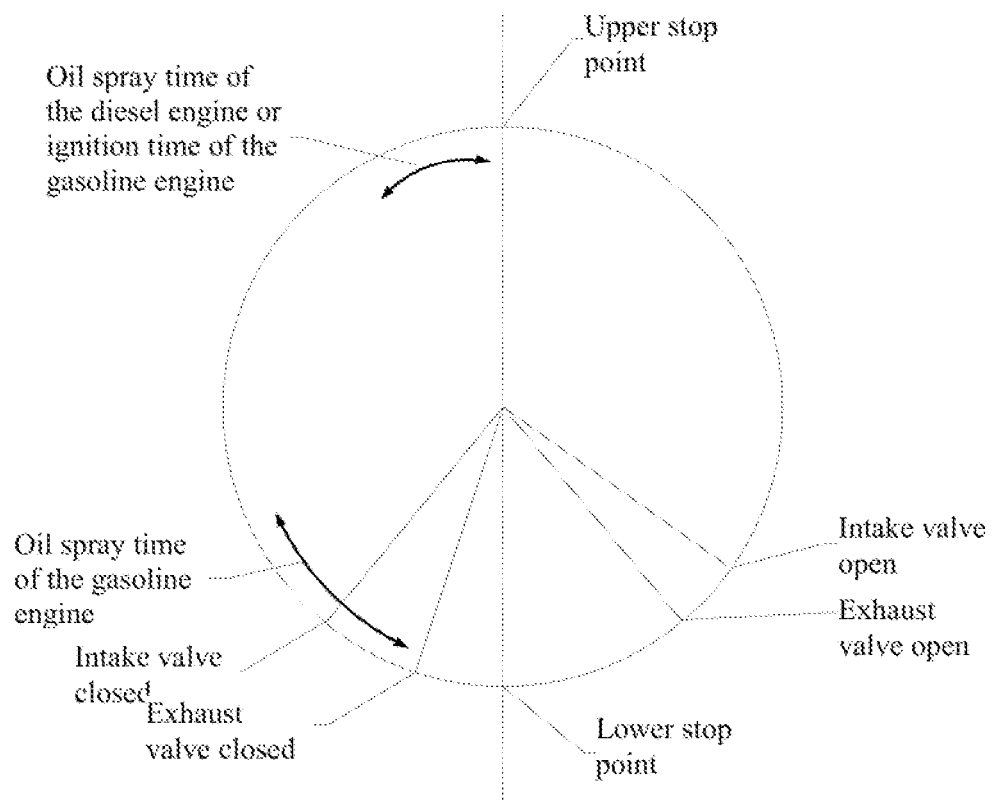
FIG. 6 is a schematic view of a sequence chart of the two-stroke internal combustion engine during working.
Figure 7:
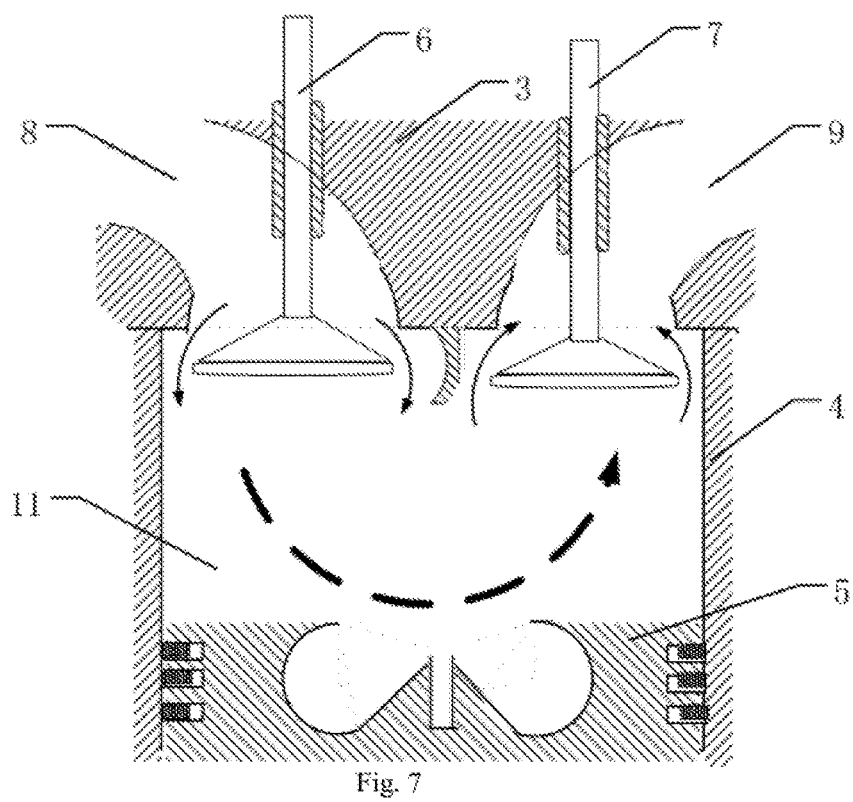
FIG. 7 is a sectional schematic view of gas exchange of the two-stroke internal combustion engine during working.

The working process of the two-stroke internal combustion engine is as follows. As shown in FIG. 1 and FIG. 6, the present invention provides a two-stroke internal combustion engine. When the internal combustion engine is not working, the piston 5 stays at the lower part of the cylinder block. After the internal combustion is started, a motor is driven to bring a crankshaft to rotate, while the piston 5 moves upward, the exhaust valve closes, and the intake valve closes. Before the piston 5 reaches the upper stop point while approaching the cylinder head 3, the diversion fin 1 enters the allowance slot 2 of the piston, and the piston 5 compresses the air into the combustor 10 in the process of moving toward the cylinder head 3. Then, the oil injector 13 sprays the fuel oil and performs ignition. The gas in the cylinder block 4 is combusted, the crankshaft continues to rotate, and the piston 5 moves downward. Then, the exhaust valve 7 is opened. In such circumstances, the gas exhausting process is in the critical state. The majority of the combusted waste gas is quickly exhausted out via the air exhaust channel 9 by the effect of the waste gas pressure in the cylinder block 4. Then, the intake valve 6 opens, and the air is pressed into the cylinder block 4 by the pressure of the air pump, extrudes and scavenges the waste gas in the cylinder. At this time, the exhaust valve 7 and the intake valve 6 are both open, preventing the air inflow from being directly exhausted by the effect of the diversion fin 1, and the air inflow is changed by the diversion fin 1 in the flow direction, good for scavenging and sufficient fuel oil combustion. After scavenging is completed, the exhaust valve 7 closes, and the air continues to enter the cylinder block 4 by the effect of the pressure and inertia, and then the intake valve 6 closes. Along with the rotation of the crankshaft and the movement of the piston 5 along the cylinder head direction, the next cycle of compression and action starts.

The internal combustion engine adopted is an F178 direct-spray diesel engine, and the cylinder has a capacitance of 298 cc, a rated power (KW/r/min) of 3.68 KW/3,000, and a fuel oil consumption rate of 276.1/3000. Through experiments, it is found that, on the basis of no special optimization, the internal combustion engine adopting such structure had output power of 7.728 KW/3,000 which was increased by 110%, and had a fuel oil consumption of 253 g/(kW·h) which was reduced by about 8%. After being tested in 48 Hr maximum-speed and full-load cases, all components did not generate abnormal wearing and fatigue damage when measured in a dissembled way. Then, after the internal combustion engine underwent subsequent optimization, the power could be further enhanced, so the two-stroke internal combustion engine has higher power and performs lower emission in comparison with the existing internal combustion engine for commercial purposes.

I claim:

1. A two-stroke internal combustion engine, comprising:
   a cylinder head;
   a cylinder body;
   a piston;
   an intake valve
   an exhaust valve;
   an oil injector
   a diversion fin; and
   an allowance slot,
   wherein said diversion fin comprises flanges at two ends and a rectangular longitudinal cross section profile
   wherein said diversion fin is clamped by said cylinder head and said cylinder block,
   wherein said diversion fin extends along the diameter direction of said cylinder head and is positioned between an air inlet channel and an air exhaust channel,
   wherein said diversion fin separates the air inlet channel from the air exhaust channel,
   wherein an upper end of the diversion fin is provided with a transverse through groove at a position corresponding to an oil nozzle of said oil injector,
   wherein said allowance slot is disposed on a piston and is positioned in the center of a combustor, and
   wherein said allowance slot is positioned corresponding to position of the diversion fin.

2. The two-stroke internal combustion engine according to claim 1, wherein the cross section of the diversion fin has an arced profile on one side, which means that the surface of the diversion fin corresponding to the air inlet channel is an inner concave.

3. The two-stroke internal combustion engine according to claim 1, wherein the height of the diversion fin is 1-3 times the upstroke of the intake valve, and the radian radius of the diversion fin is in a range of 1/8 times-4 times the diameter of the intake valve.

4. The two-stroke internal combustion engine according to claim 1, wherein the root of the diversion fin, namely diversion fin root, is installed in a diversion fin root mounting groove on the inner surface of the cylinder head, wherein an inner surface of the cylinder head is formed with the diversion fin mounting groove at a position corresponding to the deflector pin, and wherein parts of the flanges of the two ends of the diversion fin root that longitudinally extend out of the inner surface of the cylinder head are clamped and fastened by the cylinder head and the cylinder block during assembling.

5. The two-stroke internal combustion engine according to claim 1, wherein the diversion fin is provided with two vortex channels at the lower ends, wherein the two vortex channels extend along the transverse direction of the diversion fin, wherein the two vortex channels are longitudinally distributed along the diversion fin, wherein outside walls of the two vortex channels are respectively aligned with the two outside walls of the combustor, and wherein the vortex channels correspond to the loop structure of the combustor.

6. The two-stroke internal combustion engine according to claim 1, wherein the diversion fin is comprised of ceramic-based composite materials or nickel-based alloys.

* * * * *